(12) United States Patent
Heynssens et al.

(10) Patent No.: US 12,164,631 B2
(45) Date of Patent: Dec. 10, 2024

(54) MULTI-WAVELENGTH QUANTUM KEY DISTRIBUTION FOR ENHANCED SECURITY AGAINST A PHOTON NUMBER SPLITTING ATTACK AND HIGHER DATA RATES

(71) Applicant: Arizona Board of Regents on Behalf of Northern Arizona University, Flagstaff, AZ (US)

(72) Inventors: Julie B. Heynssens, Flagstaff, AZ (US); Bertrand F. Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 15 days.

(21) Appl. No.: 18/077,169

(22) Filed: Dec. 7, 2022

(65) Prior Publication Data

US 2024/0346134 A1   Oct. 17, 2024

Related U.S. Application Data

(60) Provisional application No. 63/286,912, filed on Dec. 7, 2021.

(51) Int. Cl.
  *G06F 21/55*   (2013.01)
  *H04L 9/08*    (2006.01)
(52) U.S. Cl.
  CPC .......... *G06F 21/554* (2013.01); *H04L 9/0852* (2013.01); *G06F 2221/034* (2013.01)

(58) Field of Classification Search
  None
  See application file for complete search history.

(56) References Cited

U.S. PATENT DOCUMENTS 5,953,421 A * 9/1999 Townsend ............. H04L 9/0858
                                                     398/40
6,895,092 B2* 5/2005 Tomita .................. H04L 9/0838
                                                    380/278

(Continued)

OTHER PUBLICATIONS

Bennett, C.H. et al., Quantum Cryptography: Public Key Diatribution and Coin Tossing, Proc. IEEE Int. Conf. on Computers, Systems, and Signal Processing, Bangalore (IEEE, New York, 1984) pp. 175-179.

(Continued)

*Primary Examiner* — Younes Naji
(74) *Attorney, Agent, or Firm* — Quarles & Brady LLP (57) ABSTRACT

An arrangement and method for detecting number splitting attacks in quantum key distribution systems is disclosed. According to the method, a receiver may detect the presence of an eavesdropper on a transmission channel by detecting an increase in the percent difference between the photon transmission rates of two signals of different wavelengths. The receiver may directly measure a percent difference in photon receive rates as between the two signals, and compare the measured difference with an expected difference. The expected difference may be known, or may be measured by the receiver on the basis of historical data. The expected difference may be computed from the percent difference between the means of the Poisson distributions of the transmitter's laser sources, which may be determined a priori and communicated to the transmitter.

16 Claims, 8 Drawing Sheets

(56) References Cited

U.S. PATENT DOCUMENTS

| | | | | |
|---|---|---|---|---|
| 10,491,383 | B2* | 11/2019 | Fu | H04L 9/0852 |
| 12,095,574 | B2* | 9/2024 | Lee | H04L 9/0855 |
| 2006/0075084 | A1* | 4/2006 | Lyon | H04L 65/103 |
| | | | | 709/223 |
| 2011/0069972 | A1* | 3/2011 | Wiseman | H04L 9/0852 |
| | | | | 398/186 |
| 2016/0337032 | A1* | 11/2016 | Johnson | H04J 14/02 |
| 2017/0155499 | A1* | 6/2017 | Han | H04L 9/0858 |
| 2021/0152347 | A1 | 5/2021 | Camou et al. | |

OTHER PUBLICATIONS

Guo, Fen-Zhuo et al. "Practical Covert Quantum Key Distribution with Decoy-State Method." Quantum Information Processing, vol. 18, No. 4, Springer US, pp. 1-18, 2019, doi: 10.1007/s11128-019-2181-1.

Zhou, Y-H et al. "Making the Decoy-State Measurement-Device-Independent Quantum Key Distribution Practically Useful," 2015, https://doi.org/10.1103/PhysRevA.93.042324.

Zhou, C. et al., "Tight Finite-Key Analysis for Passive Decoy-State Quantum Key Distribution Under General Attacks," 2014, https://doi.org/10.1103/PhysRevA.89.052328.

Wang, Xiang-Bin, "Three-Intensity Decoy State Method for Device Independent Quantum Key Distribution with Basis Dependent Errors," Physical Review A 87, 2012: 012320.

Takesue, Hiroki et al., "Quantum Key Distribution Over a 40-Db Channel Loss Using Superconducting Single-Photon Detectors," Nature Photonics, vol. 1, 2007.

Lo, H.K. et al., "Decoy State Quantum Key Distribution," Phys. Rev. Lett. 94, 230504, 2005.

Ma, X. et al., "Practical Decoy States for Quantum Key Distribution," Phys. Rev. Lett. A 72, 012326, 2005.

Wang, X.B. et al. "Beating the Photon-Number-Splitting Attack in Practical Quantum Cryptography," Phys. Rev. Lett. 94 230503, 2005.

Brassard, Gilles et al., "Multiuser Quantum Key Distribution Using Wavelength Division Multiplexing," Proceedings of SPIE. vol. 5260, 2003.

Hwang, W.Y., "Quantum Key Distribution With High Loss: Towards Global Secure Communication," Phys. Rev Lett. 91, 057901, 2003.

* cited by examiner

- Alice
- Chooses two random series. One for the basis, and one for the information stream
- Sends start of transmission signal
- Sets the polarization state with 6 bits written to the PSG001
- Waits > 35µS for the PSG to settle
- Triggers either the 1310nm laser OR the 1550nm laser.
- Repeats sending signals and changing polarization
- Waits for Bob's signal integrity check
- Communicates her random basis stream to Bob over a normal channel
- Alice and Bob check for errors using an encrypted message

- Bob
- Chooses one random series for basis control
- Sets the basis to first value in random series and waits for start of transmission
- Record which detector (if any) received signal
- Changes the basis if needed by the random basis series with fixed delay between basis changes
- Continue looping received signals and bases
- Checks 2 decoy channels for abnormal signals and relays info on decoys to Alice
- Receives Alice's random stream and discards signals where there is a basis mismatch
- Sends encrypted message to Alice that can be checked for errors

MULTI-WAVELENGTH QUANTUM KEY DISTRIBUTION FOR ENHANCED SECURITY AGAINST A PHOTON NUMBER SPLITTING ATTACK AND HIGHER DATA RATES

CROSS-REFERENCE TO RELATED APPLICATIONS

This application claims priority to U.S. Provisional Application 63/286,912 entitled "Multi-Wavelength Quantum Key Distribution for Enhanced Security Against a Photon Number Splitting Attack and Higher Data Rates" filed on Dec. 7, 2021, the disclosure of which is incorporated in its entirety herein by reference.

STATEMENT CONCERNING FEDERALLY-FUNDED RESEARCH

This invention was made with the support of the Government under Grant/Contract No. G1004251 awarded by the United States Air Force Research Laboratory. The government may have certain rights in the invention.

BACKGROUND OF THE INVENTION

Conventional secure communication techniques involve transmitting encrypted information over a channel such as an electrical transmission line, a fiber-optic cable, or through free space using electromagnetic waves. Such techniques make use of cryptographic methods utilizing shared secrets (i.e., a cryptographic key) between a sender and a receiver to ensure that only the intended parties can properly encode and decode a message. However, these techniques are vulnerable to eavesdropping by man-in-the-middle attacks which may lead to the content of the communication being compromised. Advanced techniques use quantum cryptographic methods which include quantum key distribution (QKD) protocols to enhance security. Quantum cryptography takes advantage of consequences of the Heisenberg uncertainty principle, namely that measurement of a quantum state necessarily disturbs that state. In practice this means that any eavesdropper to a communication over a properly implemented quantum channel will disturb the communication, revealing the presence of the eavesdropper. A shared encryption key may be generated and transmitted over a potentially insecure quantum channel, followed by verification that the key was not intercepted.

BB84 Quantum Key Distribution (QKD) was first reported by Charles Bennett and Gilles Brassard in 1984. It is now widely used as a way of transmitting secret encryption keys for one-time use (i.e., one-time pad (OTP)). Polarized single photons are sent from a single laser at a fixed wavelength in a stream from a sender, conventionally called Alice, to a receiver, conventionally called Bob.

Alice starts by choosing two binary random number strings of equal length. The first string contains the information that Alice would like to transmit referred to as Alice's bit string. The second string decides the polarization basis for the information. An R (+) basis indicates that a binary 1 in the bit stream will be transmitted at a 90° polarization angle; a 0 will be transmitted at a 0° polarization angle. If a D (X) basis is chosen, then a binary 1 is transmitted at a 135° polarization angle and a binary 0 is transmitted at a 45° polarization angle.

Figure 3:
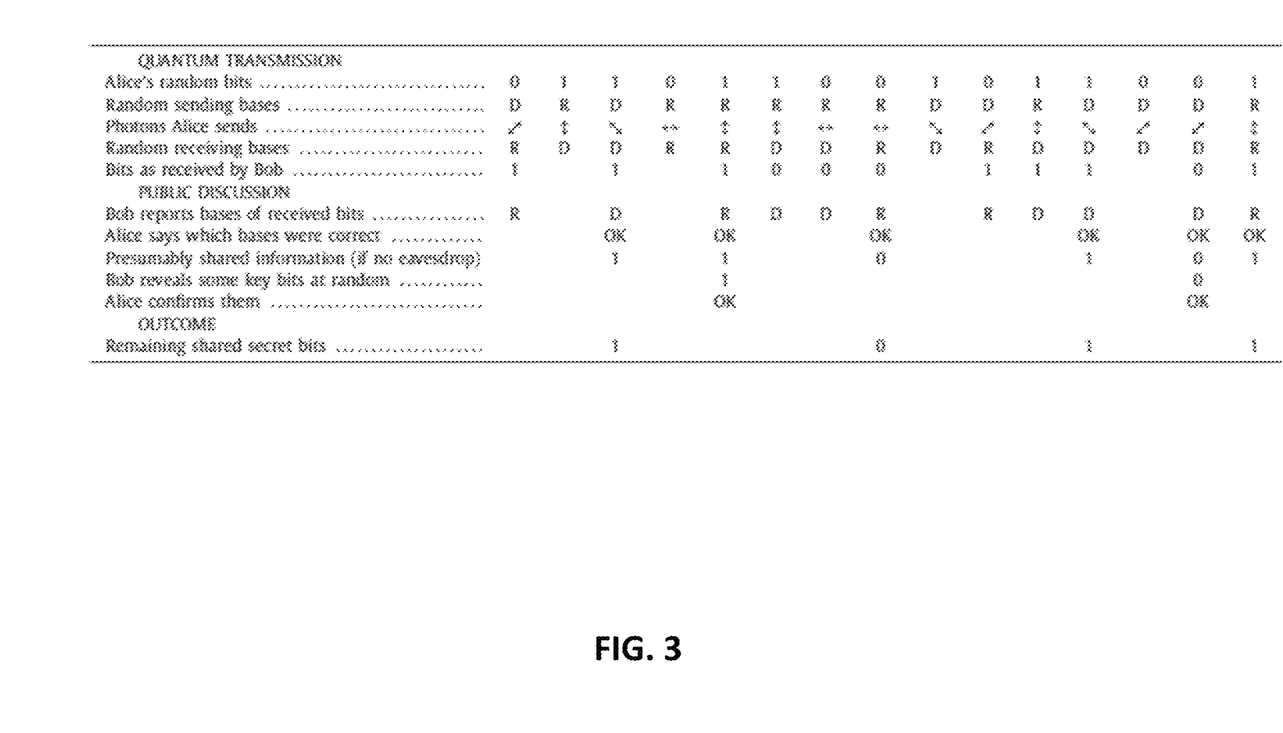
FIG. 3 depicts a BB84 QKD transmission protocol.

Bob also chooses a different random number string that indicates the basis that he will use to measure the incoming photons. When Alice and Bob's random basis selection matches, there is a high probability that Bob will measure Alice's photon correctly. When there is a mismatch between bases, there is a 50% probability of error. Since there is only one photon exchanged between Alice and Bob per bit, there is also a high probability that Bob doesn't receive a bit in the transmission. After Alice's transmission is complete, Bob sends Alice a list of times that he received bits and the bases that he used to decode those bits back to Alice over a conventional communication channel. Alice sends Bob back information on which of his received bits had an actual basis match with Alice. Bob checks some bits directly against Alice's bits. The remaining bits are used as a one-time encryption key for a secure message. This protocol is summarized in FIG. 3.

With an ideal single photon source, BB84 QKD is resistant to eavesdropping. Any attempt to read the single photon transmission will alter or block that transmission. However, there are no ideal single photon sources. Eavesdroppers have developed a method to listen in to QKD transmissions called the Photon Number Splitting Attack (PNS). In accordance with such an attack, an eavesdropper blocks all single photon transmissions between Alice and Bob. Whenever Alice inadvertently sends more than one photon to Bob, an eavesdropper takes one of the extra photons and stores it in a perfect quantum memory to measure later.

Much of the current research into QKD involves ways to thwart PNS attacks. Several methods have been proposed to preclude PNS attacks including Differential Phase Shifting (DPS) QKD and Decoy State QKD. Decoy State QKD is the most promising and much current research into QKD involves analyzing Decoy State Protocol QKD's resistance against PNS attacks. The only difference between the decoy states and the standard BB84 states is their photon number distributions. A drawback to Decoy States is that during decoy transmissions the power output from the single laser must be changed which makes it unlikely that the following information transmission will have the identical power as the information transmissions preceding the decoy transmissions.

Transmission statistics including the yield or transmission rate of photons (Yn) and rate of erroneous detection when no signal is present (en) of information transmissions are assumed to be the same from both signal transmissions and decoy transmissions.

When transmitting single photons over long lengths of lossy transmission lines, most of the photons are lost in transmission. Alice sends out many more photons than Bob receives. Alice's rate of key transmission is often in the GHz range while Bob is only receiving at BPS rates. Alice could easily get Bob's receiving rate up by sending out packets of photons instead of single photons, but this would mean that Alice would be more susceptible to a PNS attack from an eavesdropper. Security against a PNS attack is highly dependent on being able to detect the presence of an eavesdropper in real systems where many transmissions contain multiple photons, and the system losses are exceptionally high.

Sometimes Alice accidentally sends out two photons in a packet. To keep the probability of two photons low, Alice will often attenuate her laser source down to sub-photon levels where the average photon count per pulse $\mu=0.2$ photons per pulse using Poisson statistics meaning there is only about a 20% chance of Alice actually sending out a photon.

The probability of two photons in a transmission can be expressed as: $P(2\ photons) \leq \frac{1}{2} g^{((2))}(0)$. Where $g^{((2))}(0)$, is a figure of merit of the source. State of the art on sources was reported to be $g\hat{}((2)) (0)=10\hat{}(-2)$ giving a probability of 2 photons at 0.5%.

The secure key transmission rate is more important than the key transmission rate. This is the rate of transmission that is secure from eavesdropping and takes into account how many bits an eavesdropper can get in a PNS attack. A theoretical analysis of the secure key rates vs transmission line losses for various protocols is shown in FIG. 4.

Figure 4:
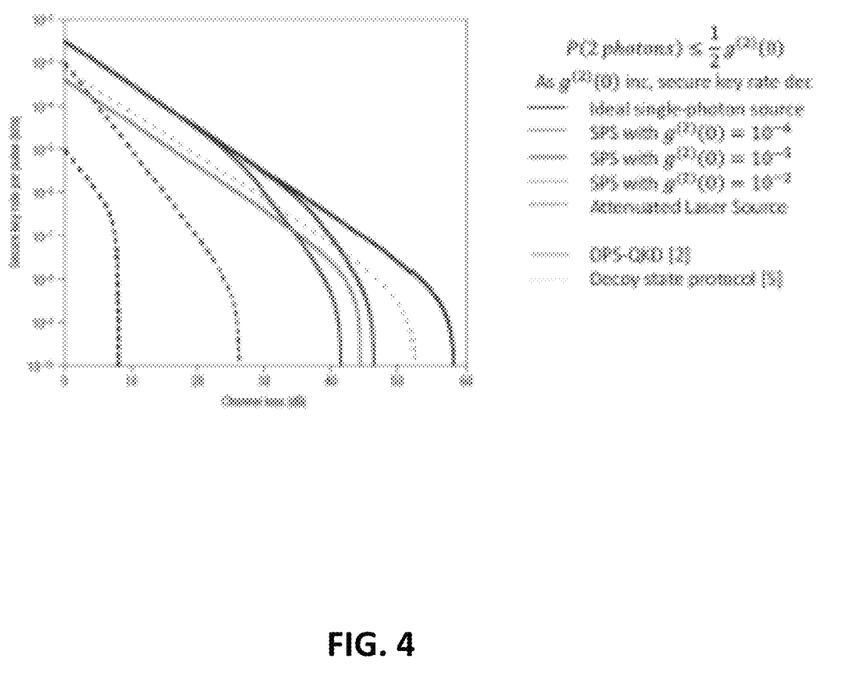
FIG. 4 depicts the comparison of theoretical key rates versus transmission loss for carious QKD protocols.

In the graph of FIG. 4, there are three types of QKD protocols. Most of the lines are BB84 with a single photon source of varying quality. The other two protocols are DPS-QKD and Decoy State Protocol QKD. For high loss transmissions both Decoy State QKD and DPS-QKD seem the most promising because of the difficulty of constructing the quality of photon sources needed for QKD with high signal loss. DPS-QKD or Differential Phase Shift QKD uses interferometers to measure the relative phase shift between two pulses instead of transmitting photons at differing polarizations angles. While in the Decoy State Protocol, Alice inserts decoy states at random times into the bit transmission stream to check for the presence of an eavesdropper.

Another system has been proposed that uses multiple wavelength QKD, but this system still only utilizes a single wavelength protocol for each user. Several users can receive on the system simultaneously and each user only utilizes one wavelength.

All of the systems described above are amenable to improved methods for detecting PNS attacks.

BRIEF SUMMARY

In the embodiments described below, a dual-wavelength QKD protocol that is resistant to PNS eavesdropping is disclosed. The two-wavelength system described herein is the first that uses both wavelengths for a single user.

The present system uses two wavelength transmissions between Alice and Bob. A two-wavelength system has twice the number of polarization states available for each transmission packet, meaning that 4 information states can be transmitted instead of 2 in a conventional BB84 system. This system will double the key rate by having more information in each transmission. On each transmission, Alice chooses both the wavelength by triggering one laser and the polarization of the light by controlling a polarization state generator device, for example, a PSG001 Polarization State Generator.

Figure 5:
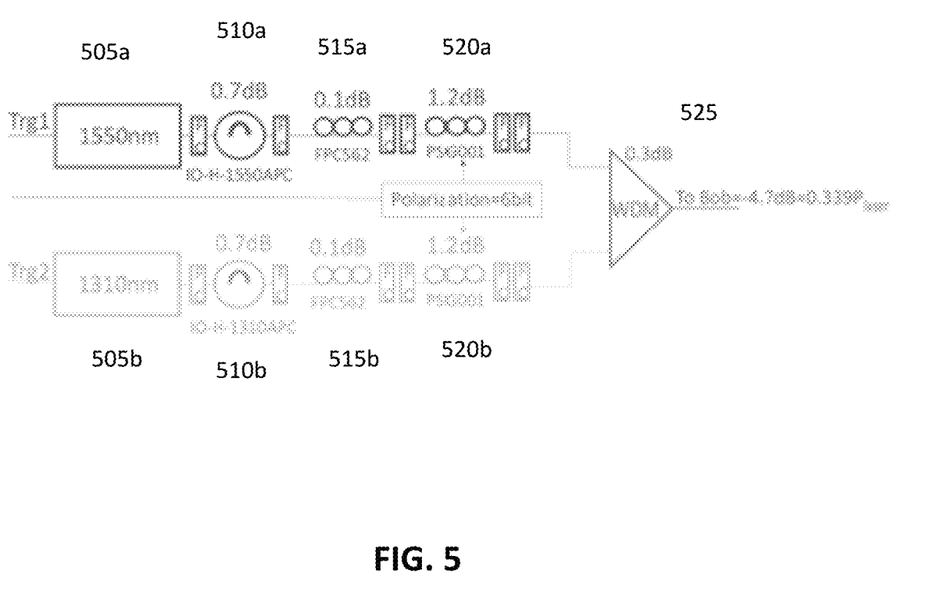
FIG. 5 depicts a transmission system using a two-wavelength protocol.
Figure 6:
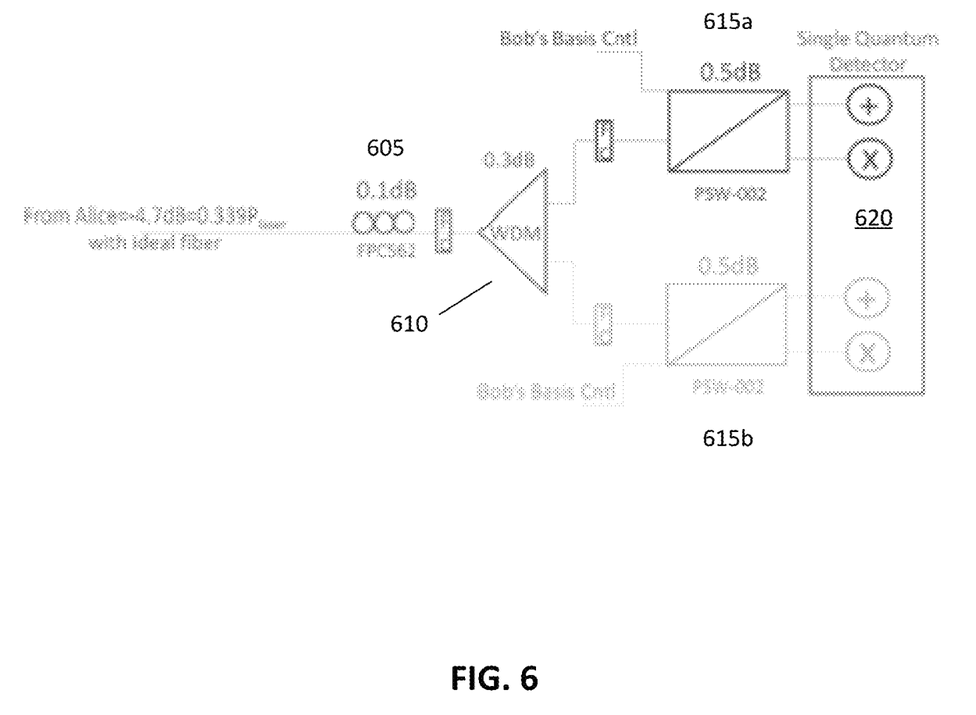
FIG. 6 depicts a receiving system using a two-wavelength protocol.

By adding the second wavelength, Alice doubles the information density of her transmissions. Alice can send trits containing 3 information states and still have two states that can act as decoy states to measure system performance. Alice can also send quatrits containing 4 information states while ensuring system security by monitoring the percent difference in the transmission rates of the two wavelengths as described below. Diagrams of the two-wavelength system are shown in FIGS. 5 and 6 below. The system protocol for Alice and Bob's exchange of a secure key using two wavelength protocol is summarized in FIG. 7.

In inventive embodiments, Bob, in addition to receiving and decoding transmissions received by Alice, also monitors the photon transmission rates on each of the wavelength channels. Bob accomplishes this by monitoring the photon receive rates on each of two wavelength channels (e.g., the rate of photons received over time on each channel, or the number received per pulse, averaged over time). Bob computes a difference, of the photon receive rate, between the two wavelength channels, which may be expressed as a percentage. This percent difference will be the same as the percent difference of the Poisson distribution means as between the two laser sources used by the transmitter, and should be the same as the photon transmission rate difference at the transmitter. If an eavesdropper is engaged in a PNS attack, the eavesdropper is intercepting single photon transmissions, while passing at least portions of multi-photon transmissions. This attack will reduce the photon receive rate of the lower energy channel (i.e., the longer wavelength) more than the higher energy channel, and thus, the PNS attack will cause an increase in the difference in the photon receive rates of the channels. This change in the difference measure can be detected by comparing a changing receive rate difference to historical data, or to an expected difference, which when normalized as a percentage, will be the same as the difference of the means of the Poisson distributions of each of Alice's two lasers. If Bob detects an eavesdropper, he can take some alert action, such as alerting Alice, refusing communication, requesting another key, etc. Alternatively, Bob can pass information on his photon receive rate difference to Alice, who can compare with expected values, derived for example from Alice's knowledge of the characteristics of the lasers.

Embodiments of the invention have certain advantages. By using two wavelengths to send data to a single recipient, security against PNS attacks can be enhanced. Additionally, the density of information that is shared between the sender and the receiver is increased by using multiple wavelengths on a single pulse or in a transmission stream. An n-wavelength system can transmit n-bits of information to the receiver simultaneously on each pulse.

Additionally, systems and methods according to inventive embodiment can detect PNS attacks or other security attacks to a QKD system by monitoring and comparing changes in the transmission statistics of the signals of each wavelength in the system. This may be accomplished, for example, by measuring the percent difference in the transmission rates of photons having each wavelength being used in the system.

Additionally, in certain embodiments, a method is provided for using unused polarization states in additional wavelengths to generate decoy states that can be used to continually monitor transmission statistics as a way to detect Photon Number Splitting Attacks and other attempts to compromise the security of the system.

The methods described herein are applicable to two, or multiple, quantum key distribution methods and are usable with existing quantum key distribution (QKD) schemes such as, not limited to, BB84, BB91, the method developed by Ekert, methods and using Einstein-Podolsky-Rosen (EPR) emission. Additionally, the methods described herein are compatible with many encoding schemes in the transmission of single qubits, qutrits, or multiple qubits.

Additionally, the methods described herein may further be combined with an exchange of information between the communicating parties to strengthen the detection of an attack.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms.

It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

Conventional optical protocols for quantum-secured communications, such as the well-known BB84 protocol for performing quantum key distribution (QKD), are based on the transmission of random sequences of bits, '0's or '1's, which are turned into quantum bits (qubits) through a quantum channel. The transmitting party uses a first random number generator to randomly select one of two possible polarization bases ('+', and 'x') for each transmitted qubit. With BB84, if the basis is '+', single photons are oriented at 0° (→) to transmit a '0', or at 90° (↑) to transmit a '1'. If the basis chosen is 'x', single photons are either oriented at 45° (↗) to transmit a '0' or at 135° (↖) to transmit a '1'. The receiving party using a second random number generator also selects a between the same polarization bases to determine how the polarization of each photon will be measured.

After transmission, both communicating parties share the respective positions of their bases to determine which photons were transmitted and measured using the same polarization basis (i.e., generated using the 'x' basis and measured in the 'x' basis or generated using the '+' basis and measured in the '+' basis). When the basis used by both parties is the same, the transmission should contain only a very small number of errors, unless an eavesdropping party disturbs the data. The portion of the stream transmitted with mismatching bases is ignored, because the error rate is in the 50% range. As part of QKD protocols, the communicating parties share a small portion of the content of the stream of qubits transmitted with bases aligned to confirm the very small number of errors and to verify that eavesdropping is not disturbing the transmission. If the number of errors is small enough, the communicating parties may assume that the key distribution is secure. An example showing communication between parties under BB84 is shown in FIG. 1.

Figure 1:
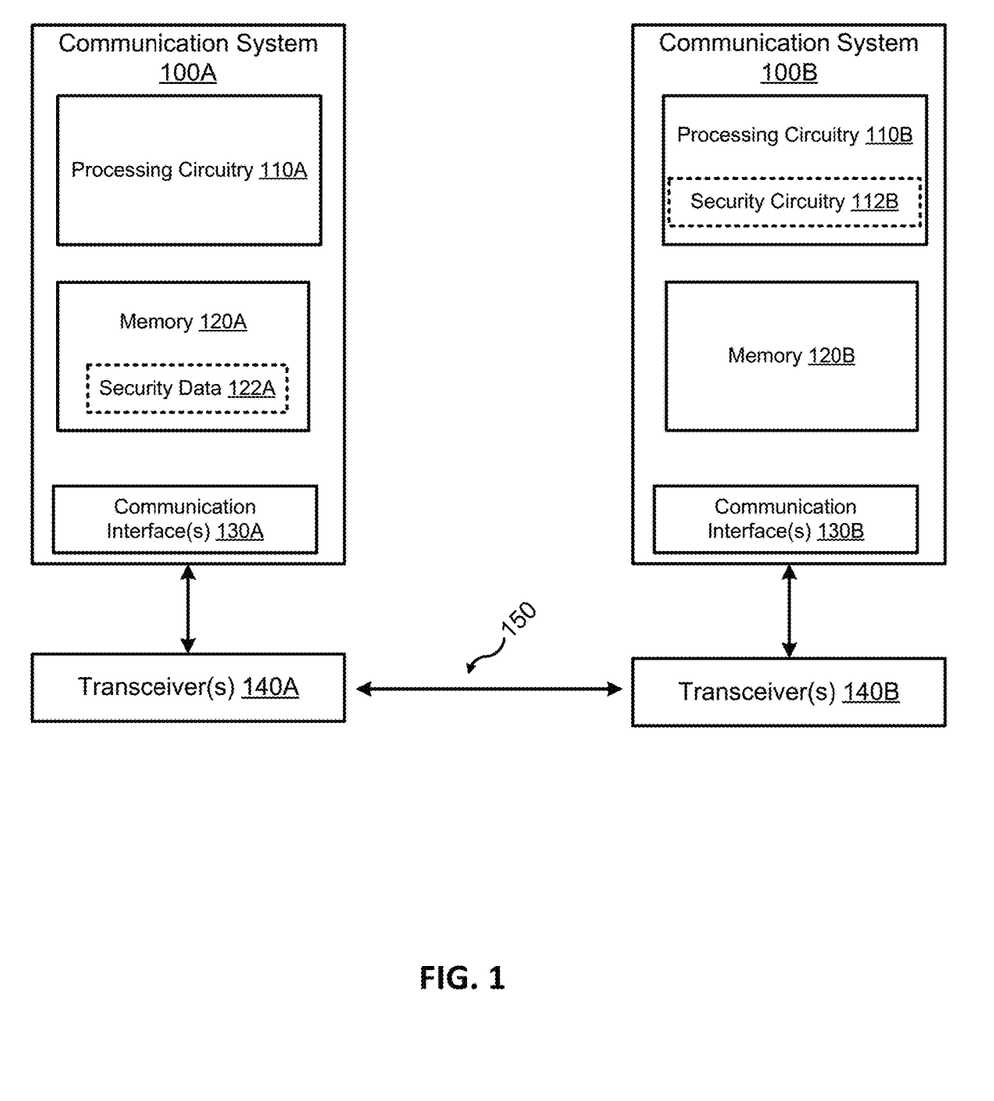
FIG. 1 depicts a schematic of example communication systems in which embodiments disclosed herein may be practiced.

FIG. 1 is a schematic illustrating communications systems in which embodiments disclosed herein may be practiced. In this example, communication system 100A acts as the sender ("Alice") and communication system 100B acts the receiver ("Bob"). The communication systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. The processing circuitry 110B of communication system 100B may optionally include security circuitry 112B, for use with certain embodiments disclosed herein. Similarly, the memory 120A of communication system 100A may optionally store security data 122A for use with certain embodiments.

In embodiments of the communication system processing circuitry 110A and 110B may include programmable processors (e.g., microprocessors) capable of executing computer executable instructions that may be stored in one or more memories for example, memories 120A 120B. Transceivers 140A and 140B may include one or more laser sources, polarization controllers, filters, beam splitters, and multiplexers/demultiplexers as will be described more fully below. In the methods described below, it should be understood that a programmable processor at a transmitter may execute certain computer executable instructions stored in a memory that cause the processor to execute method steps. Additionally, a receiver will have a processor, which also may execute instructions stored in a memory to cause the receiver's processor to perform certain method steps, such as the ones described below.

Figure 2:
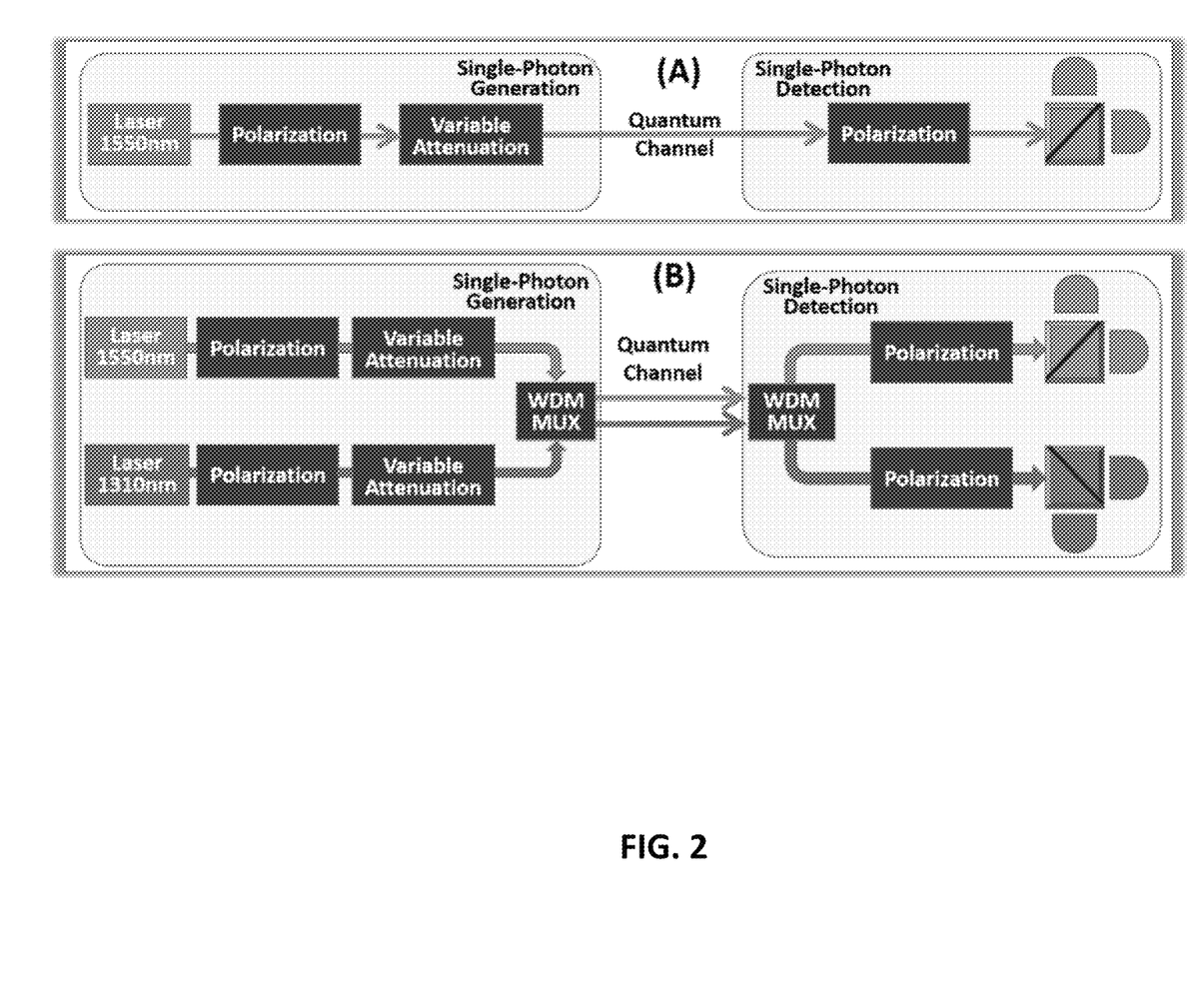
FIG. 2 depicts block level diagrams of a single-wavelength system suitable for use as a quantum key distribution system and a dual-wavelength system suitable for use as a quantum key distribution system.

FIG. 2 shows a block diagram of example systems for single-wavelength and dual-wavelength QKD between a sender "Alice" and a receiver "Bob" (e.g., the communication systems 100A and 100B of FIG. 1). In the upper arrangement, a laser operating at 1550 nm, or any other suitable photon source, generates photons which are polarized using a polarization control device according to a suitable encoding scheme to represent information (e.g., digit values of bits, digit values of trits, etc.). As shown, a variable optical attenuator may be used to adjust the number of photons such that, ideally, only single photons are produced. The signal (i.e., one or more polarized photons) is transmitted over a quantum channel (e.g., a polarization-maintaining optical medium such as a polarization-maintaining optical fiber). On the receiving end, the polarization of the received photons may be adjusted as described below before being routed to a detector, shown in this example as a pair of photodiodes coupled to a polarization-sensitive beam splitter.

Alice can send single photons to "Bob" and the polarization states of those photons encode digital information. In an example, Alice can generate a photon using a first polarization basis with two possible states: horizontal polarization and vertical polarization (this basis will be called the rectilinear basis, or '+'). Alice can also generate a photon in a basis that is rotated by 45° from the first basis (this basis will be called the diagonal basis or 'x'). In other words, the horizontal and vertical polarization axes in the second basis are rotated 45° respectively from the horizontal and vertical polarization axes of the rectilinear basis. The conversion between binary-encoded ternary values and photon polarizarions for this example is shown in Table I, below.

Each row of Table I corresponds to a possible bit pair Each bit is transmitted as one or more photons with a polarization axis defined by the choice of polarization basis ('+' or 'x') and the value of the bit. The photon polarizations for each bit pair are shown in the columns labeled "Rectinlinear basis ('+')" and "Diagonal Basis ('x')". For example when the rectilinear basis is used, the bit value '0' is transmitted as photons polarized horizontally (denoted by →) and the bit value '1' is transmitted as photons polarized vertically (denoted by →). The diagonal basis is rotated 45° from the rectilinear basis. Thus, in the diagonal basis the bit value '0' is transmitted as photons polarized horizontally in the rotated basis (denoted by ↗) and the bit value '1' is transmitted as photons polarized vertically in the rotated basis (denoted by ↖). Because the polarization axes define by the rectilinear basis are equally-weighted vector combinations of those in the diagonal basis (and vice versa), attempts to measure photons using the wrong measurement basis will produce random results. For instance, if either '↗' photons or '↖' photons are measured using the '+' basis, the result will be either '→' or '↑' in random fashion.

The system of FIG. 2 can be adapted to transmit ternary or quaternary data by coding those values as bit pairs, as in the non-limiting example of Table I below.

TABLE I

| Bit Pair | Rectilinear Basis ('+') | | Diagonal Basis (X) | |
|---|---|---|---|---|
| 00 | → | → | ↗ | ↗ |
| 01 | → | ↑ | ↗ | ↖ |
| 10 | ↑ | → | ↖ | ↗ |
| 11 | ↑ | ↑ | ↖ | ↖ |

Table II below illustrates an example of transmitting and receiving a bit stream consisting of eight binary-encoded ternary values, or 8-bit pairs. Each column indicates a bit pair belonging to the bit stream (ordered from 1 to 8). For each column the bit stream value to be transmitted is shown, along with Alice's choice of basis, Bob's choice of basis, and the resulting bit pair measured by Bob. The bit stream in this example is (10, 01, 01, 11, 10, 10, 01, and 01). As described above, the sender ("Alice") and receiver ("Bob") each select a basis for each bit pair. When Alice's basis and Bob's basis are the same, Bob measures the same values as transmitted by Alice if there has been no eavesdropping. However, when Alice and Bob randomly select different bases, Bob measures a random value. Instances of errors are shown in bold in Table II. Note that the process is not deterministic; for example, if the 5th bit pair were sent repeatedly using the same basis and measured repeatedly using the same basis, Bob might measure any of the four possible values of the bit pair. Note that when Alice's basis is aligned with Bob's basis, Bob measures the same values as those transmitted by Alice. However, when Alice's basis and Bob's bases are misaligned, each received bit will be measured randomly by the Bob as '0' or '1'.

TABLE II

|  | 1 | 2 | 3 | 4 | 5 | 6 | 7 | 8 |
|---|---|---|---|---|---|---|---|---|
| Transmitted: | 10 | 01 | 01 | 11 | 10 | 10 | 01 | 10 |
| Alice's basis: | + | x | + | + | x | + | x | x |
| Bob's basis: | + | x | x | + | + | x | x | + |
| Measured: | 10 | 01 | 01 | 11 | 01 | 11 | 01 | 01 |

As described briefly earlier, quantum communication protocols can support the direct transmission of trits across optical quantum channels. Previously described embodiments can be modified to achieve similar advantages by using a binary to ternary conversion, along with ternary keys shared between the communicating parties.

One example of a system allowing native transmission of trits involves transmitting photons with one of three polarization axes which are vertical (polarization axis of 90 degrees, '↑'), horizontal (polarization axis of 0 degrees, '→'), or diagonal (↗ or ↖) relative to one of two reference orientations such as those given by the two bases, '+' and 'x'. In this example, Alice uses N photons to transmit each trit and the value of the trit is represented by the number of photons received by Bob. Note, however, that four photon polarization axes (↑, →, ↗, ↖) are available between the two bases ('x' and '+'). When Alice and Bob communicate without eavesdropping, Bob will always measure N, N/2, or 0 photons, corresponding to the three allowed trits. However, when Bob choses the correct basis and Eve intercepts the communication using a basis which does not match Alice's, Bob's measurements will be altered, including by sometimes measuring N/4 photons. Even if Bob cannot distinguish a change in the absolute number of photons, the presence of Eve will also cause a change in the relative number of photons Bob measured for each trit in certain cases, ultimately allowing Bob to detect the presence of Eve. Such a method can be sensitive to partial eavesdropping when even only a fraction of the communication is intercepted.

Table III illustrates the scheme ternary scheme above illustrates the effect of eavesdropping in this scheme. The values in the "Trit value" column indicate the possible trit. The "Photon state" column indicates the photon polarization corresponding to each trit value for each of Alice's two possible polarization basis choices. For each photon state, Table III has four columns, each corresponding to a combination of polarizers for Bob and Eve. Instances where the presence of Eve's polarizer affects Bob's measurements are shown in bold. The columns are grouped by Bob's polarizer choice. There are two columns for each of Bob's two possible choices (0° and 45°), one where Eve's choice matches Bob's, and one where Eve's choice does not match Bob's.

TABLE III

| | | | | Bob's Polarizer | | | |
|---|---|---|---|---|---|---|---|
| | | | | Bob Chooses 0° | | Bob Chooses 45° | |
| | | Trit value | Photon state | Eve's Polarizer | Eve Chooses 0° | Eve Chooses 45° | Eve Chooses 45° | Eve Chooses 0° |
| Alice's Polarizer | Alice Chooses 0° (+) | − | → | N | N/4 | N/2 | N/2 |
| | | '0' | ↗ | N/2 | N/2 | N | N |
| | | + | ↑ | 0 | N/4 | N/2 | N/2 |
| | Alice Chooses 45° (×) | − | ↖ | N/2 | N/2 | N | N/4 |
| | | '0' | ↑ | 0 | 0 | N/2 | 0 |
| | | + | ↗ | N/2 | N/2 | 0 | N/4 |

For the single-wavelength schemes described above, it will be appreciated that when one photon is used as a qubit, it is possible for Alice and Bob to communicate by transmitting and measuring single photons. However, if photons are used as described above, and illustrated by Table III, at least two photons must be sent per trit in order for Bob to unambiguously distinguish between the three possible digit values denoted by {−, '0', +}.

As shown in the lower portion of FIG. 2, an additional light source may be added to support QKD schemes that use ternary values and beyond. Some such schemes, as described below, may be used to eliminate the need for Bob to count photons, rendering so-called photon-number splitting attacks that rely intercepting a portion of the photons sent by Alice for each unit of information and passing the rest on unaltered, ineffective. In the lower example of FIG. 2, the laser of the upper arrangement is augmented with a second laser, operating at 1310 nm in this example, or any other suitable photon source, that generates photons at 1310 nm. Both light sources may be coupled to single channel using a wavelength division multiplexing (WDM) and may be demultiplexed at the receiving end where they are routing to separate detectors. In this example, each detector includes a polarization control device coupled to a polarization-sensitive beamsplitter coupled to two photodiodes. It will be appreciated that the arrangement of FIG. 2 may be extended to support n-wavelength transmission with the addition of additional laser sources and polarization control devices at Alice's end, and the addition of additional detectors at Bob's end.

FIG. 5 illustrates an exemplary hardware environment (i.e., a transmitter) for Alice's side (i.e., a transmission side) of a communication arrangement usable with certain inventive embodiments. The arrangement of FIG. 5 is similar to the dual-laser arrangement described above with respect to FIG. 2. In the arrangement of FIG. 5, a first photon source 505a operating at a first wavelength, and a second photon source 505b operating at a second wavelength are provided. In the example of FIG. 5, these sources are preferably lasers which may be triggered by trigger signals Trg1 and Trg2, as shown, to produce a laser output. In a preferred embodiment, source 505a operates at 1550 nm and source 510b operates at 1310 nm, but these two wavelengths should not be considered limiting.

The output of each source may be coupled into a polarization preserving fiber, for example, a single mode fiber, by fiber couplers as shown. Preferably, an output fiber from each source 505a,b is then coupled to a pair of isolators 510a,b, operable to suppress retro-reflections back into the lasers which might result in instability. The output fibers may then be provided to a pair of polarization controllers 515a,b, which are usable to condition the polarization state of the outputs of the lasers have an appropriate polarization state to provide as input to a polarization state generator (520,ab). In the example of FIG. 5, polarization controllers 515a,b are passive devices (e.g., paddle-type polarization controllers) that can be used to set the output polarization state of light on fibers that transit the devices. In certain embodiments, the intrinsic output of lasers 505a,b is linearly polarized, and may be provided directly as input to polarization state generators 520a,b. In a preferred embodiment, the combination of the laser (e.g., one of 505a,b) and a polarization controller (515a,b) results in linearly polarized output light having a predetermined polarization axis selectable by adjusting the controller. The resulting polarized optical signals are then routed by fibers to a pair of programmable polarization state generators 520a,b, usable to selectively rotate the angle of light having a received input polarization by a predetermined amount. Signals on both legs of the transmitted of FIG. 5 may then be provided to a wavelength division multiplexer 525 for wavelength combination onto a single transmission output fiber, or other optical transmission conduit, which may include free speech.

In the environment of FIG. 5, unillustrated attenuators may be incorporated, preferably immediately downstream of the lasers 505a,b, in order to set the average power output of the lasers, and the lower the means of the laser's Poisson distributions, as described below.

FIG. 6 shows an exemplary hardware environment (i.e., a receiver) for Bob's side (i.e., a receiver side) of a communication arrangement usable with certain inventive embodiments. In the receiver of FIG. 6, an optical transmission channel (e.g., a fiber) provides an optical signal. The signal is optionally subject to polarization filtering or a predetermined change of polarization state, for example, by providing the signal to a polarization controller. Because the signal has originated with Alice's multi-wavelength transmitter depicted in FIG. 6, the signal is provided to a wavelength division demultiplexer, which outputs two fibers, one for each of the input wavelengths (i.e., 1550 nm and 1310 nm). The signal having a first of two wavelengths is routed to a detector assembly capable of selectively detecting signals having either a + or a X basis. In the example of FIG. 6, this may be accomplished with a controllable polarization switch (615a,b), being switchable with an input signal indicating a polarization basis, and a single quantum detector, with input channels corresponding to linearly polarized light of various angular orientations (620).

It is known that the probability function governing the probability of photon emission with a single laser pulse may be modeled as a device-specific Poisson distribution. For a two-laser system such as disclosed in FIG. 5, there will be a mismatch between the means of the Poisson distributions of the two lasers ($\mu\_\lambda1 \neq \mu\_\lambda2$). It would be difficult to exactly match the means of the two lasers, and the mismatch between two devices will generally remain stable. A laser's Poisson distribution is a representation of the statistical output of the probability that a certain number of photons will be emitted at each pulse (i.e., in response to each trigger). The mean of the Poisson distribution is the average number of photons emitted by the laser per pulse (average power). The Poisson distribution is determined by the laser, cavity, and any photonic devices connected to the laser before the transmission into the fiber (e.g., attenuators). Difficult to replicate precisely, but not a physically unclonable parameter because the Poisson distribution can be varied with variable optical attenuators in the laser/optical system. This means that each laser device will have its own average photon transmission number, that relates to the mean of its own Poisson distribution. The difference, expressed for example as a percent difference, between the photon transmission rates of each of a transmitter's sources will be constant, on average, if each source is being triggered at the same rate. The mismatch in the photon transmission rates can be used to detect a PNS attack according to a number of different embodiments. In a first embodiment, Bob knows, a priori, the means of the Poisson distributions of Alice's sources, or the difference between the means, and with this information Bob computes an expected photon transmission rate for both of Alice's sources, and/or the difference between them. The difference may be calculated as a percentage (e.g., a first source's photon transmission rate expressed as a percentage of the second source's rate). In another embodiment, Bob measures historical data on the photon transmission rate of each of Alice's sources, and/or the difference between then. In this second embodiment, Bob's characterization of Alice's transmission rate should preferably be done in a secure environment, with minimal transmission losses and one known to be free from eavesdroppers, before the Bob device may be deployed into a hostile environment where an eavesdropper may be present.

It will be appreciated that Bob is incapable of directly determining Alice's photon transmission number (i.e., photons per pulse or per packet), because the optical transmission channel between Bob and Alice will be lossy. Alice will generate many more photons than Bob will receive. Indeed, the photon reception rate on Bob's side is likely to be orders of magnitude below the transmission rate on Alice's side (Bps v. Gbps), and for each pulse or packet, Bob is likely to receive fewer photons. However, channel loses should be relatively consistent and stable over time (and relatively spectrally flat for suitably chosen wavelengths). While channel losses may vary to some degree for each wavelength, they will not change rapidly over time absent photon interception or some malfunction in the channel. This means that by measuring the difference in his photon reception rate between wavelength channels, Bob can derive a figure that is proportional to the difference in the photon transmission rate on Alice's side, absent some interference. This figure may be compared by Bob with an historical average (an increase in the difference in the photon reception rates indicating the presence of an eavesdropper on the channel), or it may be compared with an expected figure provided to Bob previously in a secure environment, or measured in a secure environment.

It should be understood that the difference between the photon reception rates at the receiver (Bob) for signals of each wavelength will be proportional to the difference in the means of the Poisson distributions for each of the transmitter's photon sources (i.e., lasers). Thus, in certain embodiments, the receiver (Bob) may receive information on the difference in the means of the Poisson distributions of the transmitter's lasers. This may be expressed as a percentage. This information may be conveyed to Bob in a secure environment. Bob may then monitor the photon receive rates on each of his wavelength channels, compute a difference, normalize that difference as a percentage, and then compare that percent difference with the percent difference between the Poisson means for the transmitter sources. When the measured photon receive rate difference varies from (e.g., exceeds) the Poisson mean difference by some predetermined threshold, Bob may conclude that there is an eavesdropper intercepting photons on one of the wavelength channels. The result of this conclusion may be an alert condition, where Bob stops a key exchange or other communication process with Alice. Alternatively, Bob may alert Alice, and Alice may take some alert action such as refusing further communication with Bob. Alice may shut down communication on just the wavelength channel where photons are being intercepted (but this is not preferred as both wavelength signals will generally share the same physical channel, i.e, the fiber).

In alternative embodiments, Bob may send to Alice information on the percent difference of the photon receive rate between two channels, and Alice may perform the threshold comparison step rather than Bob.

Thus, by continually monitoring the difference in the photon reception rate as between the two wavelength channels (which should be consistently proportional to difference in the photon transmission rates as between the transmitter's two sources), Bob can detect changes in the percent difference, which will indicate the presence of an eavesdropper on the line intercepting photons. During a PNS attack, an eavesdropper blocks all single photon transmissions and only allows multi-photon transmissions to pass. The transmission rate on each channel is decreased by the number of single photon emissions times the probability of a single photon transmission being received. Thus, a PNS attack will lower the transmission rate of both wavelengths, which will ordinarily cause a small change in transmission rate of each channel, which could be attributed to other things and ignored. However, the attack will lower the transmission rate of the lower power (longer) wavelength by a higher percentage. That is, the PNS attack will block a higher percentage of single photon emissions from the less energetic wavelength source than from the more energetic source. Thus, the difference in the two transmission rates (and therefore the reception rates) increases significantly during a PNS attack. This difference is calculated and shown in FIG. 8. When there is no eavesdropping, the percent difference between the two wavelengths remains constant, and is the same as the percent difference in the means of the Poisson distributions of the two lasers, which is information that may be given to Bob, securely, and known a-priori.

Figure 8:
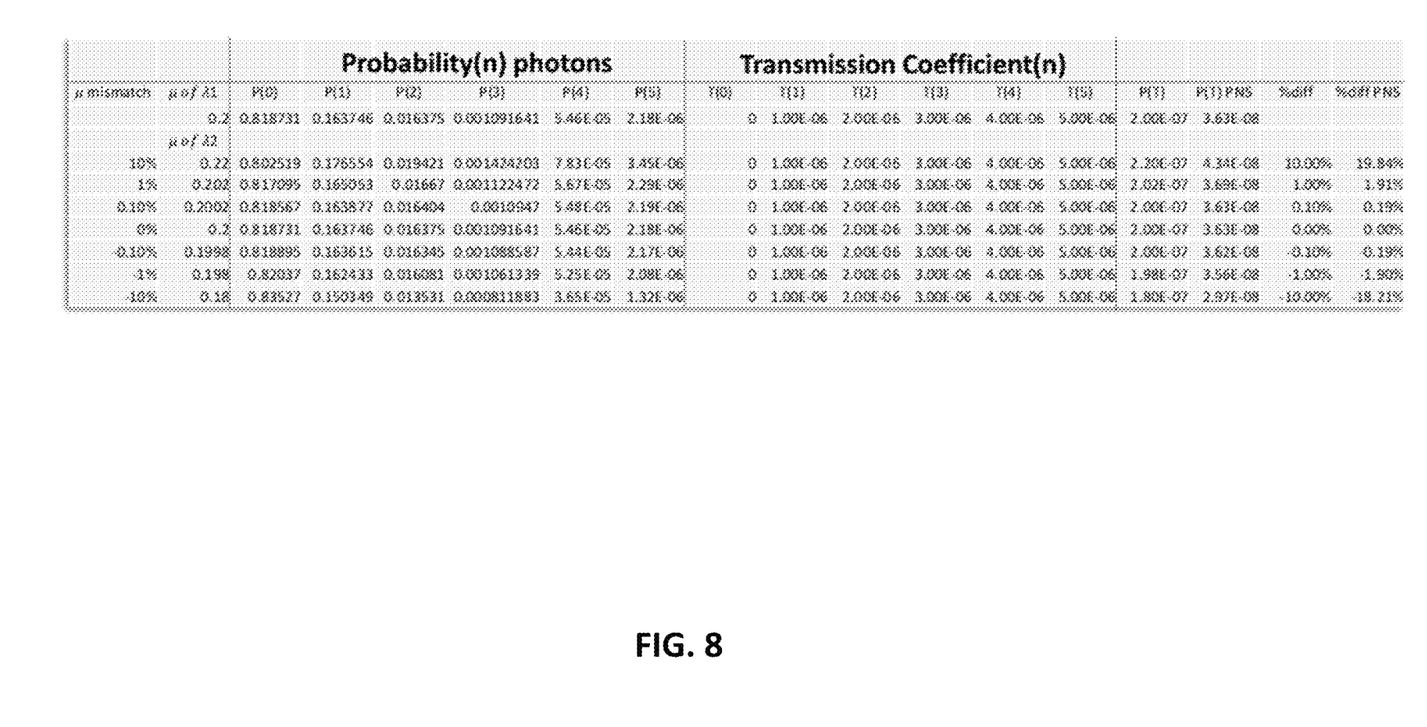
FIG. 8 depicts calculating the effects of a Photon Number Splitting Attack on the percent difference of transmission rates of lasers with two different Poisson means.

The calculated transmission rates and percent difference in the transmission rates for the two wavelengths for both undisturbed transmission and transmission during a PNS attack is summarized in FIG. 8. First wavelength1 was assumed to have a Poisson mean of 0.2. The probability of 0, 1, 2, 3, 4, and 5 photons was calculated based on Poisson statistics.

$$P(n) = \frac{\mu^n}{n!} e^{-\mu}$$

The probability of transmission (T) was estimated to be 1 ppm or $10^{-6}$ for a single photon. For two photons the probability of transmission would double to 2 ppm. The total probability of transmission of the system when a PNS attack is not occurring was calculated to be:

$$T_{undisturbed} = \sum_{n=1}^{5} P(n)T_n$$

The probability of transmission during a PNS attack when all single photon transmissions are blocked is:

$$T_{PNS} = \sum_{n=2}^{5} P(n)T_n$$

The percent differences in the two wavelengths transmission rates were calculated by:

$$\% \, diff_{UD} = \frac{T_{\lambda 2UD} - T_{\lambda 1UD}}{T_{\lambda 1UD}} * 100\%$$

$$\% \, diff_{PNS} = \frac{T_{\lambda 2PNS} - T_{\lambda 1PNS}}{T_{\lambda 1PNS}} * 100\%$$

The results are tabulated in FIG. 8 and clearly show that during a PNS attack the percent difference in the transmission rates of the two wavelengths consistently nearly doubles across a range of percent mismatch in the means of the Poisson distributions of the two lasers.

Figure 7:
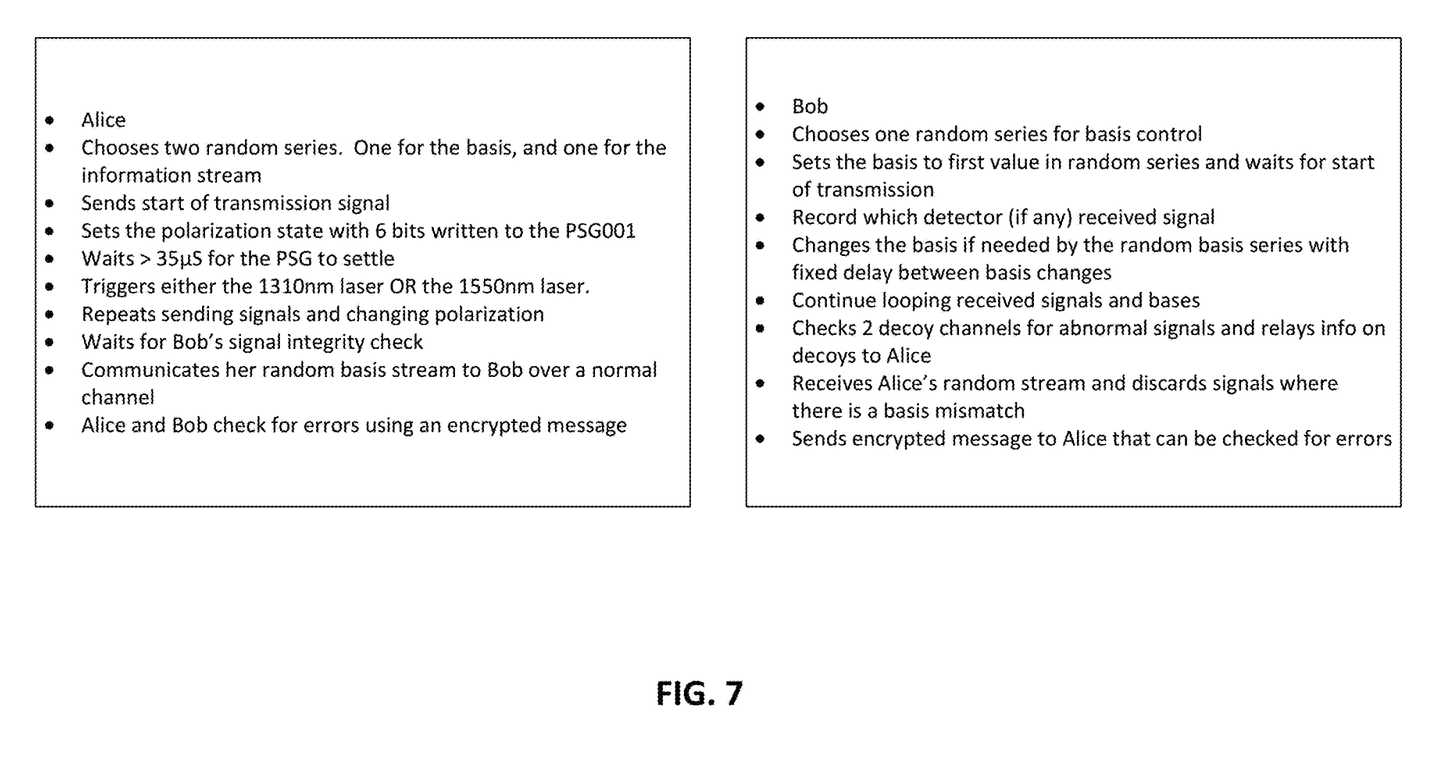
FIG. 7 depicts a summary of the two-wavelength protocol encryption key exchange.

It will be appreciated that the PNS detection scheme described above requires the use of at least two wavelengths, so that the photon reception rate as between them can be monitored for an increase and/or for deviation from the Poisson means of the sources. In QKD schemes encoding binary, multiple wavelengths are not necessary. Other schemes involving encoding ternary and quaternary data using multiple wavelength QKD arrangements have been proposed, for example, in U.S. patent Ser. No. 16/951,760 entitled "Secure Multi-state Quantum Key Distribution With Wavelength Division Multiplexing", the entirety of the disclosure of which is incorporated herein by reference in its entirety. The methods set forth in this disclosure are compatible with the multi-wavelength schemes set forth in that application. Moreover, even for binary encoding, the use of more than one wavelength source permits the sending of null or decoy pulses, which are not necessary for key generation but are useful for detecting intercepted photons according to the methods described above. An exemplary protocol is set forth in FIG. 7. In the example of FIG. 7, one of the two wavelength channels may be reserved as a decoy channel, or both can be used to send decoy pulses on an alternating basis. These decoy states are available during all signal transmissions. The decoy states are similar to vacuum decoy states in a conventional decoy state protocol. The difference is that in a conventional decoy state protocol, the vacuum decoy states are inserted into the data stream at random intervals and transmission statistics for the vacuum decoy states are monitored to detect changes that indicate eavesdropping. In the protocol of FIG. 7, decoy states are being used to monitor for these changes continuously. Additionally, in the FIG. 7 protocol, Alice is not required to change the power output on the laser between the vacuum state level and the transmission level. Any time Alice changes her laser power levels, it is highly unlikely that the laser will return to the exact same power level after the change. Changing the power level of the laser slightly will affect the transmission statistics. It is the transmission statistics that are being monitored in a conventional decoy state protocol; changing the laser power level introduces error into the transmission statistics. In contrast, the FIG. 7 protocol keeps both lasers at a consistent power which eliminates that source of error.

It should be understood that although example embodiments discussed above have particular features, the invention disclosed herein is not limited to a specific implementation of those features. For instance, various examples describe particular encodings that map polarization states to digit values. However, any suitable encodings may be used. Various examples use specific wavelengths or particular photon-generation and detection devices. However, any suitable devices may be used. For instance, a laser and variable optical attenuator may be replaced by an actual single photon source. In addition, although some examples mention the use of single photons, some embodiments may use multiple identical are substantially identical photons to represent a unit of information such as a bit, trit, or quaternary digit and the like.

While the exemplary embodiments set forth above are directed to two wavelength sources, the method disclosed herein may be extended to transmitters having n-wavelength sources, where n is more than two. In such systems, the differences between photon transmission rates (and the corresponding photon receive rates) between pairs of sources may be used to detect photon interceptions and the presence of an eavesdropper. Additionally, while in the examples set forth above, the receiver detects an increase in difference between the photon transmission rates of the transmitters two sources, alternative embodiments, the receiver sends data regarding the difference in the photon receive rates to the transmitter, which then determines that the receive rate difference is higher than expected. In these embodiments, the transmitter, rather than the receiver, may take some alert action, such as shutting down the communication channel with the receiver.

What is claimed is:

1. A method of detecting eavesdropping in a quantum key distribution (QKD) system, comprising,
at a receiver:
receiving a first signal from a transmitter, the first signal comprising a first series of photons of a first wavelength, each photon having a polarization state encoding data according to a QKD protocol;
receiving a second signal from the transmitter, the second signal comprising a second series of photons of a second wavelength, each photon having a polarization state encoding data according to the QKD protocol;
determining, from the received first signal, a first photon receive rate of photons of the first wavelength;
determining, from the received second signal, a second photon receive rate of photons of the second wavelength;
determining, from the first and second photon receive rates, a percent difference in a photon receive rate between the first and second signals;
comparing the determined percent difference in the photon receive rate between the first and second signals to an expected percent difference in a photon receive rate between the first and second signals, wherein the expected percent difference in the photon receive rate between the first and second signals is received by the receiver from the transmitter;

on the basis of the comparison, determine whether an eavesdropper is intercepting photons sent to the receiver, wherein, in the event the receiver determines that there is an eavesdropper intercepting photons, the receiver takes an alert action comprising refusing further communication with the transmitter.

2. The method of claim 1, wherein the expected percent difference in the photon receive rate between the first and second signals is determined by the receiver based on historical data measured by the receiver.

3. The method of claim 1, wherein the receiver derives the expected percent difference in the photon receive rate between the first and second signals on the basis of information regarding a photon transmission rate of a first laser source at the transmitter transmitting the first signal, and a second laser source at the transmitter transmitting the second signal.

4. The method of claim 3, wherein the information regarding the photon transmission rate of the first and second laser sources includes information on a first mean of a Poisson distribution of the first laser source and a second mean of a Poisson distribution of the second laser source.

5. The method of claim 4, wherein the receiver computes the expected percent difference in the photon receive rate between the first and second signals on the basis of a percent difference between the first and second means.

6. The method of claim 1, wherein the receiver determines the presence of an eavesdropper if the determined percent difference in the photon receive rate varies from the expected percent difference in the photon receive rate by a predetermined value.

7. The method of claim 1, wherein the QKD protocol is BB84.

8. The method of claim 1, wherein the receiver constructs an encryption key out of a bitstream received within the first signal, but not the second signal.

9. A receiver configured for detecting eavesdropping in a quantum key distribution (QKD) system, comprising, a programable processor in electronic communication with a memory storing computable readable instructions that, when executed by the programable processor, are operable to cause the processor to:

receive a first signal from a transmitter, the first signal comprising a first series of photons of a first wavelength, each photon having a polarization state encoding data according to a QKD protocol;

receive a second signal from the transmitter, the second signal comprising a second series of photons of a second wavelength, each photon having a polarization state encoding data according to the QKD protocol;

determine, from the received first signal, a first photon receive rate of photons of the first wavelength; determine, from the received second signal, a second photon receive rate of photons of the second wavelength;

determine, from the first and second photon receive rates, a percent difference in a photon receive rate between the first and second signals;

compare the determined percent difference in the photon receive rate between the first and second signals to an expected percent difference in a photon receive rate between the first and second signals, wherein the expected percent difference in the photon receive rate between the first and second signals is received by the processor from the transmitter;

on the basis of the comparison, determine whether an eavesdropper is intercepting photons sent to the receiver, wherein, in the event the processor determines that there is an eavesdropper intercepting photons, the processor takes an alert action comprising refusing further communication with the transmitter.

10. The receiver of claim 9, wherein the expected percent difference in the photon receive rate between the first and second signals is determined by the processor on the basis of historical data measured by the receiver.

11. The receiver of claim 9, wherein the processor derives the expected percent difference in the photon receive rate between the first and second signals on the basis of information regarding a photon transmission rate of a first laser source at the transmitter transmitting the first signal, and a second laser source at the transmitter transmitting the second signal.

12. The receiver of claim 11, wherein the information regarding the photon transmission rate of the first and second laser sources includes information on a first mean of a Poisson distribution of the first laser source and a second mean of a Poisson distribution of the second laser source.

13. The receiver of claim 12, wherein the processor computes the expected percent difference in the photon receive rate between the first and second signals on the basis of a percent difference between the first and second means.

14. The receiver of claim 9, wherein the processor determines the presence of an eavesdropper if the determined percent difference in the photon receive rate varies from the expected percent difference in the photon receive rate by a predetermined value.

15. The receiver of claim 9, wherein the QKD protocol is BB84.

16. The receiver of claim 9, further including instructions operable to cause the processor to construct an encryption key out of a bitstream received within the first signal, but not the second signal.

* * * * *